United States Patent
Boutin et al.

(10) Patent No.: US 7,454,271 B2
(45) Date of Patent: Nov. 18, 2008

(54) METHOD FOR ORGANIZING AND EXECUTING A PLURALITY OF SERVICES IN PARTICULAR ON BOARD A MOTOR VEHICLE

(76) Inventors: Samuel Boutin, 10, chemin de la Chapelle, Magny les Hameaux (FR) 78114; Hugo Chale Gongora, 8, rue Boyer Barret, Paris (FR) 75014; Arjun Panday, 183-bis Rue du Faubourg Poissoniere, Paris (FR) F-75009

( * ) Notice: Subject to any disclaimer, the term of this patent is extended or adjusted under 35 U.S.C. 154(b) by 533 days.

(21) Appl. No.: 10/488,242

(22) PCT Filed: Sep. 12, 2002

(86) PCT No.: PCT/FR02/03119

§ 371 (c)(1),
(2), (4) Date: Jun. 8, 2005

(87) PCT Pub. No.: WO03/023533

PCT Pub. Date: Mar. 20, 2003

(65) Prior Publication Data

US 2005/0283278 A1  Dec. 22, 2005

(30) Foreign Application Priority Data

Sep. 12, 2001  (FR) ................... 01 11794

(51) Int. Cl.
*G06F 17/00* (2006.01)

(52) U.S. Cl. ................................. 701/1; 701/36

(58) Field of Classification Search ............ 701/1, 701/36
See application file for complete search history.

(56) References Cited

U.S. PATENT DOCUMENTS

| 5,728,933 | A | * | 3/1998 | Schultz et al. ............. 73/146.5 |
| 5,732,074 | A | | 3/1998 | Spaur et al. |
| 5,787,367 | A | | 7/1998 | Berra |
| 5,799,193 | A | | 8/1998 | Sherman et al. |
| 6,018,293 | A | * | 1/2000 | Smith .......................... 340/438 |
| 6,067,008 | A | * | 5/2000 | Smith .......................... 340/438 |
| 6,185,501 | B1 | * | 2/2001 | Smith et al. ................. 701/200 |
| 6,882,917 | B2 | * | 4/2005 | Pillar et al. .................. 701/48 |

FOREIGN PATENT DOCUMENTS

| GB | 2 298 070 | 8/1996 |
| WO | 99/56201 | 11/1999 |

OTHER PUBLICATIONS

Max Fuchs, et al.: "Advanced Design and Validation Techniques for Electronic Control Units", SAE Paper 980199 1998, XP002204717.

Kai Koskimies, et al., "Automatic Synthesis of State Machines from Trace Diagrams", Software Practice & Experience, vol. 24, No. 7, pp. 643-658 Jul. 1, 1994.

(Continued)

*Primary Examiner*—Yonel Beaulieu
(74) *Attorney, Agent, or Firm*—Oblon, Spivak, McClelland, Maier & Neustadt, P.C.

(57) ABSTRACT

A method for organizing and executing a plurality of services, in particular on a motor vehicle. According to the method, a) a plurality of cases of use are defined for each of which, within a context, a demand invokes a reaction that implements a particular functionality, and b) the reaction is selectively activated upon detection of the transmission of the demand within the context.

13 Claims, 1 Drawing Sheet

OTHER PUBLICATIONS

David Harel, "Statecharts: A Visual Formalism for Complex Systems", Science of Computer Programming, vol. 8, pp. 231-274 1987.
Bruce William Watson: "Taxonomies and Toolkits of Regular Language Algorithms", Online! Eindhoven University of Technoloby, Sep. 15, 1995.

G. Bucci, et al.: "Tools for Specifying Real-Time Systems", Real-Time Systems, vol. 8, No. 2/3, pp. 117-172 Mar. 1, 1995.
Stephane Some, et al.: "From Scenarios to Timed Automata: Building Specifications from Users Requirements", IEEE Comput. Soc, pp. 48-57, Dec. 6, 1995.

* cited by examiner

METHOD FOR ORGANIZING AND EXECUTING A PLURALITY OF SERVICES IN PARTICULAR ON BOARD A MOTOR VEHICLE

BACKGROUND OF THE INVENTION

1. Field of the Invention

The present invention relates to a method for organizing and executing a plurality of functionalities, especially in a motor vehicle.

2. Discussion of the Background

From International Patent WO 99/56201 there is known a method for reprogramming a system forming part of a motor vehicle (internal combustion engine, electric motor, brake system, etc.) or of a system related to a user of the said vehicle (mobile telephone, navigation system, radio receiver, etc.). Such reprogramming may be necessary to ensure execution of a functionality such as, for example, the adjustment of the operation of the engine after a certain operating time, or the updating of the list of telephone numbers recorded in the directory of the mobile telephone. The described method, designed to ensure a reprogramming accessible only to authorized persons or entities, executes such reprogramming or programming of a new function by means of remote input, into a microprocessor, of a compiled executable code of a complete software program capable of assuring this reprogramming or of executing this new function. The input of such a complete software program obviously takes place at high data rate. Thus it is disadvantageously cumbersome to use.

SUMMARY OF THE INVENTION

The object of the present invention is to provide an automatic controller on the basis of a plurality of cases of use that define a functionality.

Another object of the invention is to permit reprogramming of functionalities, specific to a motor vehicle, for example, by modifying already installed functionalities or adding new functionalities, such reprogramming not requiring knowledge of the architecture of the microprocessor used for execution of the functionalities. Thereby it involves a much smaller volume and is executed by means of information transfer at low rate, by comparison with that required by the method described in the cited patent.

This object of the invention as well as others that will become apparent upon reading the description to follow is achieved with a method for organizing and executing a plurality of functionalities, especially in a motor vehicle, this method being noteworthy in that a) there is defined a plurality of cases of use (CU) for each of which, within a context ($C_i$), a demand ($D_j$) invokes a reaction ($R_k$) that implements a particular functionality, and b) the said reaction is selectively activated upon detection of transmission of the said demand ($D_j$) within the said context ($C_i$).

As will be seen in detail hereinafter, this method makes it possible, in return for a prior refined analysis of the architecture, to include the functionalities in question in the executable software, to subsequently modify these functionalities or to add new functionalities, by means of inputting information at much lower rate than in the case of the method described in the cited International Patent WO 99/56201, the use of such inputting then being much easier.

BRIEF DESCRIPTION OF THE DRAWINGS

Other characteristics and advantages of the present invention will become apparent upon reading the description hereinafter and examining the attached drawing, wherein.

DETAILED DESCRIPTION OF THE PREFERRED EMBODIMENTS

Figure 1:
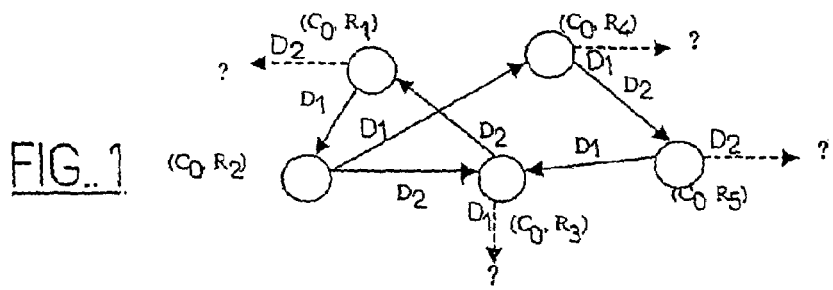
FIG. 1 is a graphical representation of an automatic controller corresponding to the use of the present invention.

A motor vehicle is normally provided with a plurality of physical systems: motive power unit and devices for braking, suspension, heating, air conditioning, communication, etc., for use by the vehicle driver in order to achieve diverse "functionalities".

The first step of the method according to the invention comprises formalizing the cases in which the driver uses each of the systems. For this purpose, an operating "context", the driver's "demand" and the "reaction" of the system to such a demand transmitted within the said context is defined for each of these "cases of use".

As an illustrative and non-limitative example:

1) the context of use may be composed of information obtained from the environment: temperature of the passenger compartment, speed of the vehicle, driving condition (outside temperature, presence of rain, etc.). Such information can be detected by means of appropriate sensors or else can be calculated.

The context may also take into account information produced during previous reactions during use of the functionality.

2) the driver's demands are his actions on elements or interfaces (pushbutton, key, vocal-command recognition device, etc.) that enable him to request or modify one of the functionalities offered by the vehicle. The demands may be implicit when the driver is not in control of the situation; for example, putting himself in an accident situation is a demand for which the driver is not responsible.

3) the reactions of the system are events that activate the functionalities themselves: turning on the windshield wipers, activation of a flashing light, display of an icon on a screen, etc.

The formalization of the cases of use is supplemented according to the invention by timing information that indicates the delay with which a reaction must be used and the delay with which a context or a demand must be taken into account.

As an example of cases of use defined in this way there can be cited the following: regardless of the value of the vehicle parameters, a driver's "demand" represented by pressing the "emergency lights" pushbutton—which is a demand that must be taken into account—invokes a "reaction" wherein four flashing lights having a repeat frequency of 2 Hz are turned on.

In this way there are established three formalized lists of contexts, demands and reactions.

The identified cases of use (CU) can be combined as functionalities that are independent of one another (such as, for example, wiping of windows and the operation of an illuminating device), activated concurrently if necessary. Hereinafter there will be described only the inventive organization of a single functionality, the other functionalities being organized analogously.

To define the automatic controller corresponding to all functionalities, the following steps are performed. During a first step, a first functionality is taken into account. During a second step, for the functionality under consideration, the contexts $CA_i$ of the automatic controller that each represent a set of values of the vehicle parameters that are not affected by the functionality but that affect the functionality are identified. For example, whether the engine is stationary or running is not affected by the air-conditioning functionality, but it affects that functionality.

In a third step, for each context $CA_i$ of the automatic controller and for each case of use $CU_j$ whose context corresponds to $CA_i$, there is defined for each response $R_{ij}$ of the case of use $CU_j$ a state $E_{ij}$ such that, by definition, $R_{ij}$ is executed when $E_{ij}$ is accessed.

In a fourth step, there is initiated an iterative process that stops when an iteration does not add a further transition to the automatic controller.

During each iteration of this iterative process, the following steps are performed for each case of use $CU_j$:

identification of pairs $(CA_i, E_{jk})$ compatible with the context of the case of use $CU_j$, creation, in the automatic controller, for each of these pairs $(CA_i, E_{jk})$, the transition that leads from $(CA_i, E_{jk})$ to $(CA_j, E_{ij})$ by the demand $D_1$ of the case of use $CU_j$, where $E_{ij}$ is a state implementing the response of the case of use $CU_j$, and if the state $E_{ij}$ does not already exist, addition within the context $Ca_j$ of the automatic controller.

Return to the stop condition at the beginning of the iteration.

Finally, there is a return to the second step, for another functionality that has not yet been processed.

If a case of use is added to a functionality during a new step, the third and following steps are reproduced if the new case of use induces a new response. Otherwise a skip to the fourth step takes place.

It is noted that the context represents at least one mode of operation of the system, the modes being available in all functionalities and being beyond the direct control of the functionalities, for example a mode representing an available energy level and/or a type of user of the system and/or an accident or non-accident condition of a vehicle.

In particular, the context may represent a context of the automatic controller of the system, composed of a complete combination of modes of operation of the vehicle, the contexts of the automatic controller in this way being available to all functionalities, the cases of use representing all the responses or absences of response of the system within all contexts of the automatic controller, those representing together all combinations of the modes of operation of the vehicle.

Figure 2:
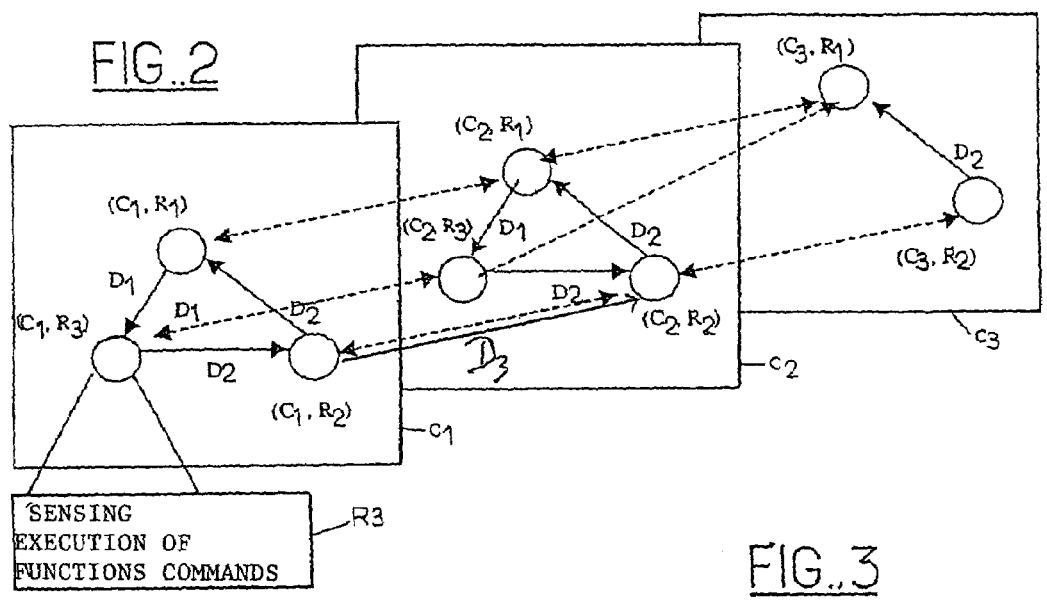
FIG. 2 is a graphical representation of an another automatic controller corresponding to the use of the present invention for a particular functionality within different contexts.

When, within a context $Ca$ of the automatic controller, the different states correspond to different reactions $Rj$, then they are characterized by the pairs $(Ca, Rj)$ and it is not necessary to name them (convention used for FIGS. 1 and 2).

Before concluding the study making it possible to establish the contexts of use CU, it is appropriate to make sure that this study is exhaustive.

For this purpose there will be defined, for each functionality, the formalized demands that may occur "simultaneously" by virtue of the delay with which they are taken into account or because several users may have access to them. The CUs obtained for each context with a set of concurrent demands that form a new formalized demand to be designated as "simultaneous demand" will then be validated or invalidated, as will a formalized reaction in the list of formalized reactions of the functionality.

Preferably a change of context of the automatic controller will have higher priority than a formalized demand. Thus the possibility of simultaneous occurrence does not have to be taken into account in this case. If a demand to change the context of the automatic controller and a simple driver's demand occur concurrently, the change of context of the automatic controller is processed first, then the formalized demand. By definition, two changes of context of the automatic controller cannot arrive simultaneously (for example, the aforesaid contexts of "engine running" and "engine stationary" obviously cannot coexist).

It is also appropriate to ensure that the formulated automatic controller is correct. During this step, if two states of the automatic controller are linked by different demands in the same initial state, the need to define a priority between the system responses is then determined, and this priority is incorporated as an attribute of the outputs of the state. Typically, priority information comes after the cases of use have been designed. It is possible that, for mechanical or other reasons, two potentially concurrent demands can in fact never be implemented concurrently. In this case, it is necessary to wait for a more advanced design step to be certain that it is not necessary to specify a priority, unless that can be guaranteed directly (example: opening a door and closing a door). In addition, if two identical demands lead to different states, there then exists an incompatibility that must be corrected, and one of the demands must be suppressed and therefore the corresponding case of use must be defined.

It is also appropriate to ensure that the formulated automatic controller is complete according to the process explained hereinafter with reference to FIG. 1, which is a graphical representation of this automatic controller for the case in which the preliminary study has made it possible to identify a single context $C_0$ of the automatic controller, two demands $D_1$ and $D_2$ and 5 possible reactions ($R_1$ to $R_5$). In FIG. 1, the different states ($C_i$, $R_k$) are represented by circles and the transitions between states upon demand $D_1$ or $D_2$ are represented by solid arrows. Thus, for example, the transition from state ($C_0$, $R_2$) to state ($C_0$, $R_4$) takes place by demand $D_1$, and from this latter state to state ($C_0$, $R_5$) by demand $D_2$.

Dashed arrows schematically illustrate potentially missing transitions—not represented by a solid arrow—upon demand $D_1$ or $D_2$. It is seen that if the transitions from the state ($C_0$, $R_2$) upon demand $D_1$ or $D_2$ are complete, the same is not true for the other 4 states represented.

For each of these other states ($C_i$, $R_k$), it will then be necessary to verify that the demand $D_1$ or the demand $D_2$ cannot trigger a transition to another state.

At the hardware level, the different identified contexts, demands and reactions can be recorded at various predetermined locations in RAM in the form of a Boolean value set to "1", for example to signal the existence of this or that context of the automatic controller or demand, or to produce this or that reaction. An appropriate computer, such as a duly programmed microprocessor, or hardware means such as a wired or printed circuit, make it possible to give physical form to the automatic controller used in the present invention.

Referring now to FIG. 2 of the attached drawing, the structure of an automatic controller suitable for using a particular functionality within different contexts $C_1$, $C_2$ and $C_3$ of the automatic controller is graphically illustrated. Demands $D_1$, $D_2$ make it possible to command, depending on the context of the automatic controller, transitions to the states characterized by the reactions $R_1$, $R_2$ or $R_3$. As an example, block $R_3$ details the reactions activated in state $(C_1, R_3)$: sensing of values, magnitudes, execution of different functions, diverse commands, etc. In each of the three blocks marked c1, c2, c3 there are grouped the states identified within the contexts $C_1$, $C_2$ and $C_3$ respectively of the automatic controller.

As for the automatic controller of FIG. 1, the solid arrows illustrate the transitions between states commanded by demands $D_1$ or $D_2$ formulated by the vehicle driver. In contrast, the unidirectional or bi-directional dashed arrows illustrate transitions between contexts of the automatic controller.

Thus, a demand $D_2$ formulated from a state $(C_1, R_3)$ commands a transition to state $(C_1, R_2)$. If a demand $D_3$ implying a change of context of the automatic controller then appears, the state evolves to the state $(C_2, R_2)$ shown in block c2.

The automatic controller permitting execution of the particular functionality in question having been defined (as illustrated by FIG. 2), what remains is to encode and input the said automatic controller into RAM, as indicated hereinabove. A demand monitor observes at each instant the state of the Boolean values representing these demands. The transitions between states resulting from these demands and conditions dictate the activation of sensors, elements, functions or commands with which the demanded functionality can be executed in any of the states identified during the analysis of this functionality.

Figure 3:
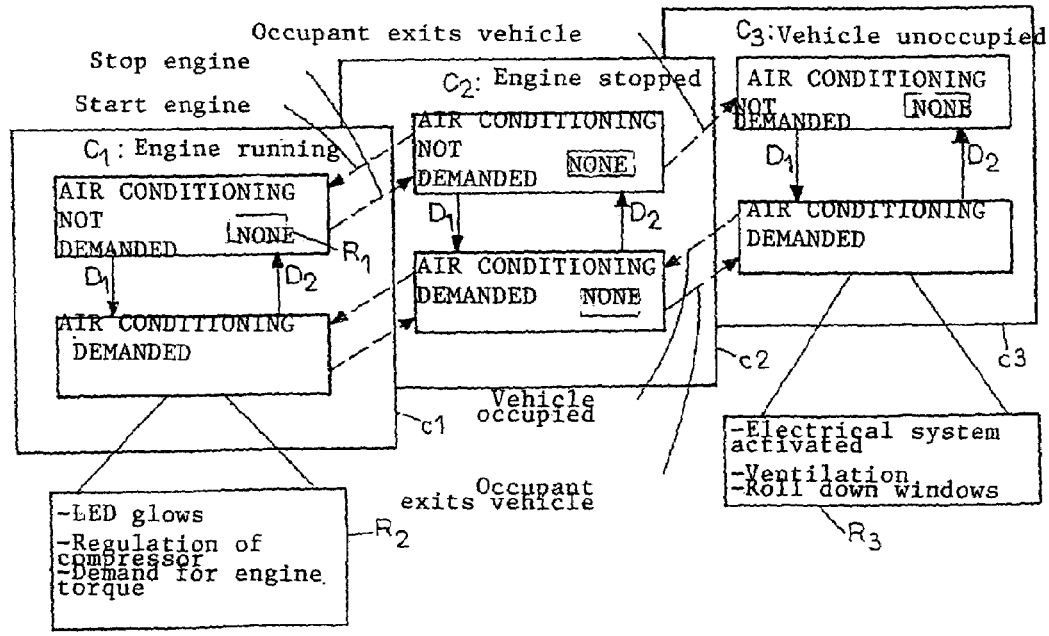
FIG. 3 is a functional diagram of an automatic controller of the type of that illustrated in FIG. 2, adapted, for example, to control of the air conditioning of the passenger compartment of a motor vehicle, according to the inventive method.

Referring now to FIG. 3, there is described an example of application of the method for organizing and executing functionalities according to the present invention.

EXAMPLE

The functionality analyzed is the command for air conditioning of the passenger compartment of a motor vehicle. It is described by a set of CUs such that:
a) within the context in which the engine is running, the client demands air conditioning, the response to which is the turning on of the air conditioning and the signaling of such turning on.
b) within the context in which the engine is stationary and the client demands air conditioning, nothing happens In the first analysis, this command can be illustrated by two blocks c1 and c2 corresponding to contexts $C_1$ and $C_2$ of the automatic controller in which the engine driving the vehicle is respectively running or stationary.

Within context $C_1$ of the automatic controller, the first and second states $(C_1, R_1)$ and $(C_1, R_2)$ are identified. The state $(C_1, R_1)$ corresponds to "air conditioning not demanded" and therefore to an absence of reaction, illustrated by the qualifier "none" corresponding to $R_1$.

The state $(C_1, R_2)$ corresponds to "air conditioning demanded" upon demand $D_1$. The reaction $R_2$ is that an LED on the instrument panel then glows to confirm to the driver that the air-conditioning has been activated by activation of a refrigerant compressor and regulation thereof to achieve a predetermined temperature in the passenger compartment as set by the driver and, as the case may be, by a demand for additional torque to the motor, to avoid torque jolts, etc.

Within this context $C_1$, when the driver demands that the air-conditioning be turned off (demand $D_2$), this demand commands a transition of the automatic controller from the state $(C_1, R_2)$ to the state $(C_1, R_1)$.

Within the context $C_2$ (engine stationary), a demand $D_1$ to activate the air-conditioning must not have any effect, because of the fact that the driver does not usually remain in his vehicle when it is stopped. The reaction to demands $D_1$ and $D_2$ is then always $R_1$ (=none).

The broken arrows illustrate the changes of state that result from changes of context of the automatic controller caused by the "stop engine demand" or "start engine demand", which clearly illustrate the case of a parameter (engine condition) that affects the functionality but is not affected by the functionality.

According to an advantageous characteristic of the inventive method, it is possible to develop the "air-conditioning" functionality described hereinabove even if this development was not envisioned during the design of this functionality.

Thus, the automatic controller can be modified in such a way as to give the driver the possibility of activating the air-conditioning even if the vehicle is not occupied.

Such a possibility adds additional comfort to the vehicle, in the sense that the air of the passenger compartment can be brought to an agreeable temperature even before the driver gets into this passenger compartment, when it has become overheated because the vehicle has been left to stand for some time in the sun, for example.

Within this context $C_3$, "vehicle unoccupied", of the automatic controller, a distinction is made between two states $(C_3, R_1)$ and $(C_3, R_3)$. The broken arrows illustrate the changes of state resulting from changes of context of the automatic controller (occupant exits the vehicle, vehicle occupied).

Upon a demand $D_1$ of the driver located outside his vehicle, input by means of a remote command that in traditional form also causes the vehicle doors to be unlocked, the electrical system of the vehicle can be activated in order to start up the interior ventilation of the vehicle and to roll down the windows of the vehicle. The set of these commands comprises the reaction $R_3$ of the state $(C_3, R_3)$.

It is understood that this supplementary capacity of activation of the air-conditioning of the unoccupied vehicle can be easily added to the automatic controller by input or remote input, into the RAM containing the "tables of values" corresponding to the "air-conditioning" functionality, of a few supplementary numerical identifiers, which correspond to $C_3$ and $R_3$ and therefore to a low data rate.

It is now apparent that the invention readily makes it possible to achieve one of the stated objects, that of providing, for organization and execution of functionalities, a method designed to permit modifications to the functionalities or addition of new functionalities, by means of simple additions to the initial programming.

By virtue of the use of an automatic controller that executes the "intermediate" language described hereinabove, the architecture of the microprocessor hosting the automatic controller does not have to be taken into account when these modifications or new functionalities are introduced. Such introduction is achieved by means of remote input of a light volume of supplementary instructions at low rate, and not by complete re-input of modified or added functionalities, such as known from the prior art, constituting re-input of a heavy volume at high rate.

Of course, the invention is not limited to the "air-conditioning" application described hereinabove, and on to the contrary, extends to any other application that may have to be implemented in the environment of a motor vehicle, such as, for example: control of opening/closing of the doors, activation/deactivation of an alarm, storage of adjustments specific to the driver (seat, rear-view mirrors, etc.), connection of a navigation system to a motor-traffic information system or to any other service accessible via the Internet, etc., etc . . . .

Nor is the invention limited to the evolution of an existing functionality, and as indicated hereinabove, it also extends to the addition of a new functionality.

The invention also extends to applications that take demands other than those originating from the vehicle driver into account. Thus, for example, once the vehicle reaches a certain age or a certain mileage, actions of calibration or adjustment of the engine justified by its age or wear condition could be triggered automatically.

The invention also extends to organizing and executing functionalities in an environment other than the motor-vehicle environment.

The invention claimed is:

1. A method for executing a plurality of functionalities, comprising:
   a) defining a plurality of cases of use for each of which, within a context, a demand invokes a reaction that implements one of said functionalities;
   b) selectively activating the reaction upon detection of transmission of the demand within the context;
   c) defining, for each functionality implemented by a system of hardware and software components, a plurality of cases of use of the functionality, each case of use being composed of:
      a context corresponding to conditions of application of the case of use, in a form of computerized parameters or of physical states of hardware components,
      a user's demand, and
      a response of the system to the demand, and
      wherein the system carries out the response upon detection of the transmission of the demand within the context;
   d) for each functionality, automating execution of the functionality with an automatic controller of the system of hardware and software components, transitions of the automatic controller representing demands of the cases of use and states representing execution of responses of the cases of use, and
   e) identifying the context of the automatic controller that each represent a set of values of vehicle parameters that are not affected by the functionality but that affect the functionality.

2. A method according to claim 1, further comprising: during a designing, for each functionality:
   defining the states corresponding to execution of the responses of cases of use within their respective contexts, and, in an iterative manner, until an iteration does not add a transition, for each case of use:
      identifying pairs compatible with the context of the case of use,
      creating, in the automatic controller, for each of the pairs, a transition that leads to another pair by the demand of the case of use, the another pair including a state implementing the response of the case of use, and
      if the state does not already exist, adding the state within the context.

3. A method according to claim 1, wherein the designing comprises:
   adding a formalized case of use of the functionality, specified by an initial context or situation of the system, a user's demand to the system, and a response of the system corresponding to a change of its state,
   and, in an iterative manner for each already constructed state, performing a search to determine whether each already constructed state is compatible with the context of the added case of use and, if so, constructing a new system state linked to the state already constructed by the demand for the added case of use, the new state taking into account the already constructed state and its modification by the response of the added case of use.

4. A method according to claim 1, wherein the context represents at least one mode of operation of the system, modes being available in all functionalities.

5. A method according to claim 4, wherein the modes of operation include at least one of a mode representing an available energy level, a mode representing a type of user of the system, and a mode representing an accident or non-accident condition of a vehicle.

6. A method according to claim 5, wherein the context represents a context of the automatic controller of the system, composed of a complete combination of modes of operation of the vehicle, the context of the automatic controller thereby being available to all functionalities, the cases of use representing all responses or absences of response of the system within all context of the automatic controller, those representing together all combinations of the modes of operation of the vehicle.

7. A method according to claim 1, further comprising a completing, wherein there are envisioned, for each response, all the client demands not yet processed and a designer is asked whether processing of the demand must be performed in the state corresponding to that response.

8. A method according to claim 1, further comprising a correcting wherein, for a given state, if two states of the automatic controller are linked thereto at the output by the same demand, a determination is made whether it is necessary to eliminate one of the two states.

9. A method according to claim 1, further comprising a junction wherein, if two states have a same interface with respect to other states, the two states are combined in a single state.

10. A method according to claim 1, wherein said user's demand is implicit.

11. A method according to claim 1, wherein said functionalities are functionalities of a motor vehicle that includes said system of hardware and software components, wherein said context includes information related to said motor vehicle and detected by sensors on said motor vehicle, and wherein said user is a driver of said motor vehicle.

12. A method according to claim 11, further comprising recording said context identified in said step of identifying.

13. A method according to claim 4, wherein the modes are unaffected by the functionalities.

* * * * *